United States Patent [19]

Solov et al.

[11] 3,731,521

[45] May 8, 1973

[54] SYSTEM AND METHOD FOR MONITORING THE PERFORMANCE OF A DUAL PLATFORM INERTIAL NAVIGATION SYSTEM

[75] Inventors: Edwin G. Solov, Wayne; Frank J. Pasquariello, Paterson, both of N.J.

[73] Assignee: The Singer Company, Little Falls, N.J.

[22] Filed: Sept. 8, 1971

[21] Appl. No.: 178,669

[52] U.S. Cl. ................................................73/1 E
[51] Int. Cl. ............................................G01c 21/00
[58] Field of Search ........................73/1 D, 1 E, 178

[56] References Cited

UNITED STATES PATENTS

| | | | |
|---|---|---|---|
| 3,391,568 | 7/1968 | Dozier | 73/1 D |
| 3,403,874 | 10/1968 | Boskovich | 73/178 |

*Primary Examiner*—S. Clement Swisher
*Attorney*—S. A. Giarratana

[57] ABSTRACT

An improved monitoring system and method is provided for comparing the orientations of two inertial platforms in an inertial navigation system so as to determine whether or not any of the gyroscopes in either platform has failed and, if so, to identify the failed gyroscope. The two inertial platforms are positioned so that the inertial cluster of one is skewed relative to the inertial cluster of the other. The two clusters will change their relative orientations if a gyroscope in either begins to drift. In the monitoring system of the invention, the synchro read-outs from the platforms are introduced to a computer which transforms the cluster coordinates into body coordinates. The computer then computes the relationship between the two cluster coordinates, and provides a particular read-out for variations in the relationship. This read-out identifies the particular gyroscope in the particular inertial platform which is malfunctioning.

6 Claims, 5 Drawing Figures

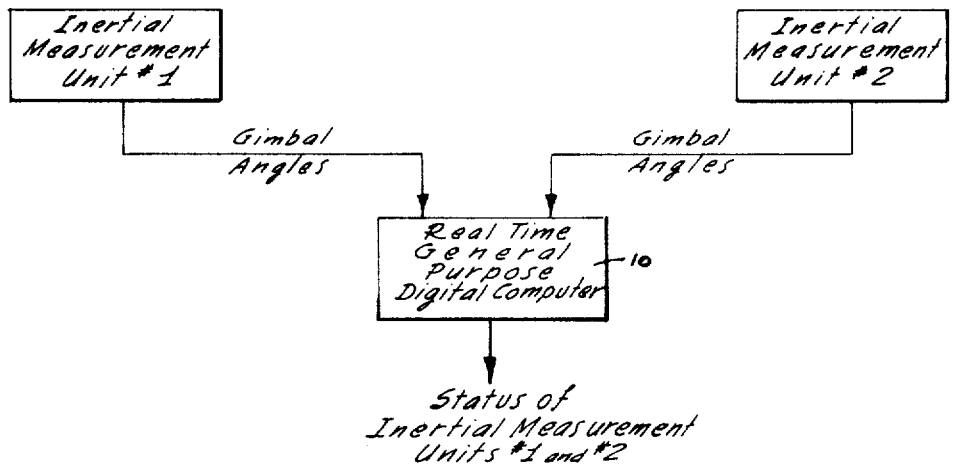
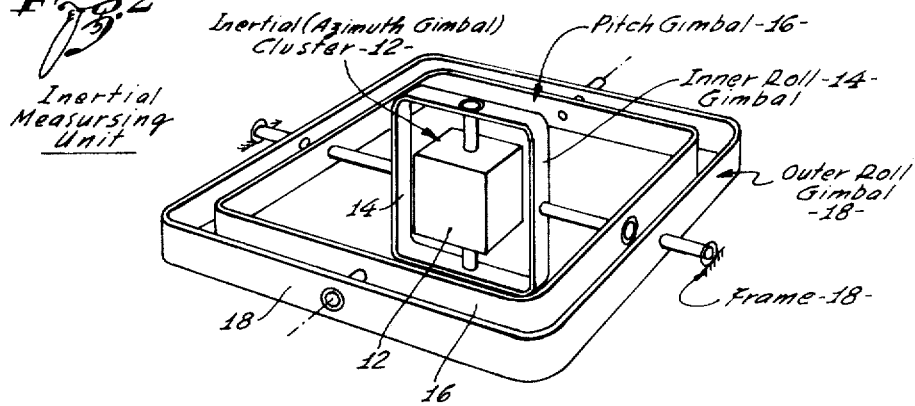
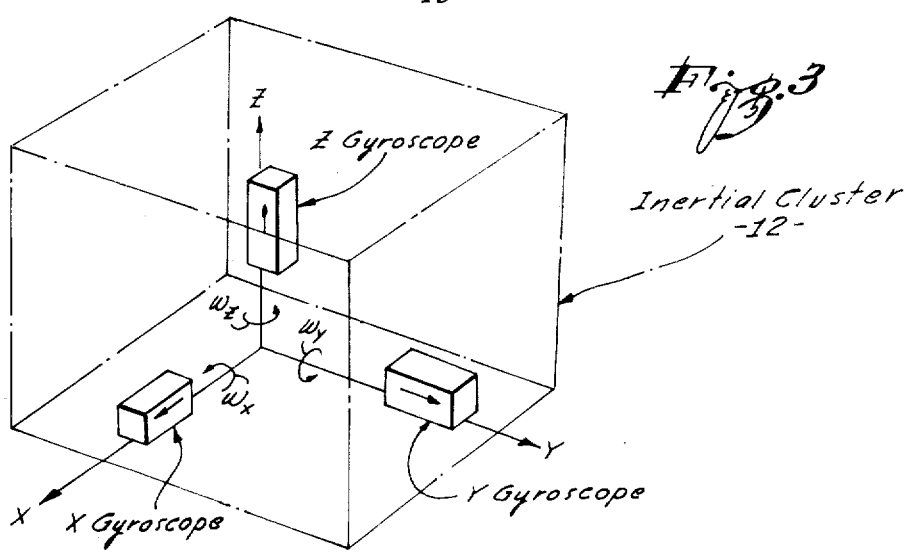

Fig. 4
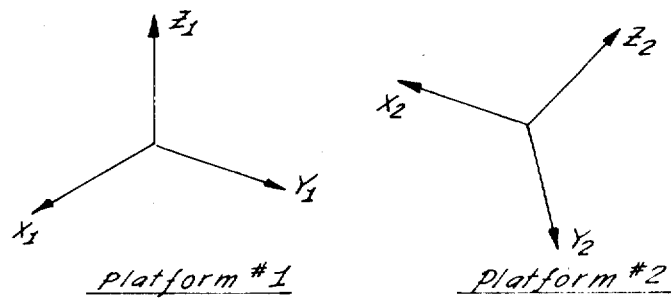
Platform #1      Platform #2
Fig. 5    Inertial Measurement Unit
          Functional Schematic
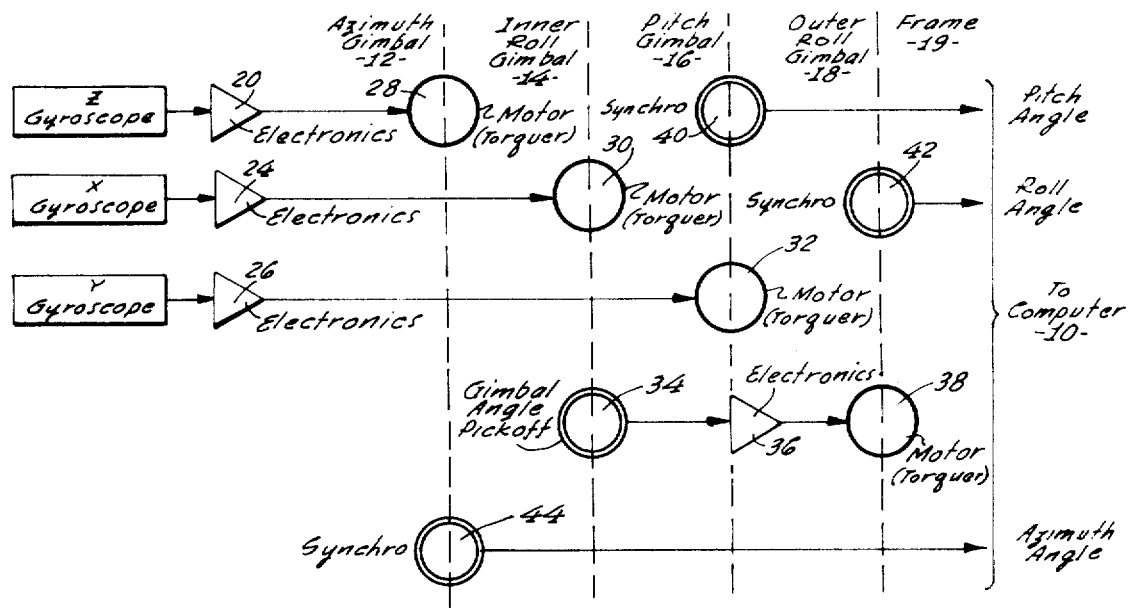

SYSTEM AND METHOD FOR MONITORING THE PERFORMANCE OF A DUAL PLATFORM INERTIAL NAVIGATION SYSTEM

BACKGROUND OF THE INVENTION

The inertial type of navigation system has become of increasing importance in recent years. In the inertial type system, a platform or instrument cluster is made stable in inertial space by mounting it in a gimbal support, and by the use of gyroscopes to provide an invariable system of inertial reference axes against which the attitude of the vehicle in which the system is mounted can be measured.

The aforesaid instrument cluster forms the inertial measuring unit of the system, and it is essential that the output signals from the inertial measuring unit be reliable at all times. In order to achieve a high degree of reliability, many prior art systems, and particularly those used for the navigation of aircraft, rely on two separate inertial platforms on a redundancy basis. Then, if one platform should fail, the other is available to provide the desired navigation signals.

With the two-platform system, an ambiguity can arise as to which of the two platforms is providing the incorrect navigational signals in the event that the signals produced by the two platforms do not compare with one another. Several systems for monitoring the platforms and for resolving the aforesaid ambiguity have been developed in the prior art. However, such prior art systems, for the most part, are somewhat complex, and rely on an indirect approach which affects their reliability.

Systems have also been proposed in the prior art which incorporate a third inertial platform, and, in the event of a malfunction, the incorrect platform is identified by a voting technique, by which the two platforms providing the same signals are assumed to be correct, and the single platform providing different signals is assumed to have failed. However, the increased cost of the three-platform systems renders them prohibitively expensive for many applications where cost is an important factor.

The present invention provides a dual platform type of inertial navigation system, in which monitoring of the individual inertial measuring units is achieved simply and economically, and without the need for a third inertial platform. The monitoring system of the present invention utilizes a direct approach, and it is capable of reliably identifying the malfunctioning gyroscope, in the event the outputs from the two inertial measuring units do not agree with one another.

RELATED COPENDING APPLICATIONS

Application Ser. No. 78,773 - Murray S. Goldstein et al., entitled "Method and Apparatus for Performance Monitoring of Dual Platform Inertial Navigation Systems".

BRIEF DESCRIPTION OF THE DRAWINGS

FIG. 1 is a block diagram showing the introduction of the outputs of the two inertial measuring units to a computer so as to carry out the concepts of the invention;

FIG. 2 is a perspective representation of a stable platform inertial measuring unit;

FIG. 3 is a schematic perspective representation of the inertial cluster which is included in the unit of FIG. 2;

FIG. 4 is a schematic diagram of the relative orientation of the inertial clusters of the two platforms incorporated into the system of the invention; and FIG. 5 is a functional schematic diagram of each inertial measuring unit utilized in the system of the invention.

DETAILED DESCRIPTION OF THE ILLUSTRATED EMBODIMENT

As shown in FIG. 1, the system of the invention comprises a pair of inertial measuring units designated No. 1 and No. 2; the outputs of which are applied to a general purpose computer 10 which, in turn, makes the necessary computations so that the system may be monitored as to the reliability of the signals provided by the inertial measuring units. The inertial measuring units No. 1 and No. 2 may be of the same construction, and a brief description of the construction thereof is contained herein with respect to FIGS. 2, 3 and 5. The general purpose computer 10 will not be described in detail, since any appropriate general purpose computer may be used to perform the necessary computations.

As is well known, the inertial measuring unit provides a reference frame to which the navigational variables are computed. Specifically, the inertial measuring unit provides acceleration measurements in the reference frame, and it also provides vehicle attitude measurements with respect to the frame. Since the present invention is concerned with attitude rather than acceleration, the following description will be directed solely to the components of the inertial measuring unit which are used in conjunction with the attitude measurements of the vehicle in which the system is installed.

A typical instrument measuring unit is designated by the cube 12 in FIG. 2, which includes the instrument cluster required to provide the attitude measurements. The cluster contained both gyroscopes and accelerometers. The accelerometers provide acceleration measurements which are transmitted to the computer 10 of FIG. 1, in which the navigational computations are performed. The gyroscopes mounted on the cluster 12 sense the cluster rates, which are caused by vehicle motions, and transmit signals to corresponding direct current motors or "torquers" to maintain a fixed cluster orientation with respect to inertial space. This latter function of the cluster is the essence of maintaining a stable reference for the navigation system.

As shown in FIG. 2, the cluster 12 is mounted pivotally on an inner roll bracket 14 which, in turn, is pivotally mounted on a pitch bracket 16, the pitch bracket being mounted on an outer roll bracket 18, the latter being pivotally mounted to the frame 19 of the vehicle. The resulting gimbal arrangement permits the inertial cluster 12 to be maintained in a fixed orientation with respect to inertial space.

For example, and as illustrated in FIG. 3, the inertial cluster 12 includes three gyroscopes designated the "X", "Y" and "Z" gyroscopes, which are mounted respectively on the X, Y and Z axes of the unit, and which rotate about the respective axes. As shown in FIG. 5, the X, Y and Z gyroscopes produce electrical outputs which are processed in appropriate electronic circuitry represented by the blocks 20, 24 and 26, respectively, and whose outputs are applied to corresponding electric motors, known as "torquers".

The torquers are designated 28, 30 and 32, with the Z gyroscope controlling the torquer 28, the X gyroscope controlling the torquer 30, and the Y gyroscope controlling the torquer 32. Any tendency for the unit 12 to depart from its fixed orientation in space causes the affected gyroscopes to introduce error signals to the respective torquers, which cause the torquers to maintain the cluster 12 in its fixed orientation.

In accordance with known inertial platform techniques, a redundant outer roll axis is provided, and is controlled by a gimbal angle pick-off on the inner roll gimbal, which is designated 34 in FIG. 5. The output from the pick-off 34 is processed by appropriate electronics represented by the block 36 and controls a torquer 38 coupled to the outer roll gimbal 18. Appropriate synchros 40, 42 and 44 are electrically coupled to the pitch gimbal 16, outer roll gimbal 18, and azimuth gimbal 12, respectively, and these synchros provide signals representing the pitch angle ($\theta$), the roll angle ($\phi$), and the azimuth angle ($\psi$), respectively, the signals being applied to the computer 10 of FIG. 1.

As shown in FIG. 1, the signals from the inertial measuring unit No. 1 corresponding to the aforesaid pitch, roll and azimuth angles, and the signals from the inertial measuring unit No. 2 corresponding to the pitch, roll and azimuth angles, are applied to the computer 10, so that it may monitor the status of the inertial measurement of the two inertial measuring units.

If a gyroscope in the inertial cluster 12 of either of the inertial measuring units No. 1 or No. 2 should malfunction in such a way that it begins to drift and thus slowly change its orientation, the corresponding cluster will also begin to rotate about the axis along which the malfunctioning gyroscope is aligned. This angle through which the affected cluster rotates represents an error with respect to the true orientation of the reference fame. The system of the invention detects this erroneous motion by comparing the gimbal angle measurements of the two inertial measuring units so as to identify, by means of the computations of the computer 10, which inertial measuring unit has failed and, in particular, which gyro in the identified inertial measuring unit has failed.

Measuring synchro angles from the two inertial measuring units provides a measure of the relative orientation of one cluster to the other. If the two clusters are arranged in such a way that the axes of one cluster are skewed with respect to the axes of the other, as shown in FIG. 4, it then becomes possible to determine which cluster has rotated with respect to the other. In the practice of the invention, the platforms of the two inertial measuring units 01 and 02 are aligned in the manner shown in FIG. 4, so that the cluster of one is skewed relative to the cluster of the other. By using the usual platform synchro outputs, the orientation of each cluster relative to the vehicle is known. Then, if the transformation matrix of measuring unit No. 1 to the vehicle frame is $T_1$, and if the transformation from measuring unit No. 2 to the vehicle frame is $T_2$, then the transformation from measuring unit No. 2 to measuring unit No. 1 is given by B where:

$$B = T_1^{-1} \cdot T_2 \qquad (1)$$

If the clusters are each orthogonal, then $T_1$ and $T_2$ are orthogonal matrices, and $$B = T_1^T \cdot T_2 \qquad (2)$$

The definitions of the transformation matrices $T_1$, $T_2$ are as follows:

$$T_1 = \begin{bmatrix} \cos\theta_1 \cos\psi_1 & \cos\theta_1 \sin\psi_1 & -\sin\theta_1 \\ (\sin\theta_1 \sin\phi_1 \cos\psi_1 - \sin\psi_1 \cos\phi) & (\sin\theta_1 \sin\phi_1 \sin\psi_1 + \cos\phi_1 \cos\psi_1) & \sin\phi_1 \cos\theta_1 \\ (\cos\phi_1 \sin\theta_1 \cos\psi_1 + \sin\phi_1 \sin\psi_1) & (\cos\phi_1 \sin\theta_1 \sin\psi_1 - \cos\psi_1 \sin\phi_1) & \cos\phi_1 \cos\theta_1 \end{bmatrix} \qquad (3)$$

$$T_2 = \begin{bmatrix} \cos\theta_2 \cos\psi_2 & \cos\theta_2 \sin\psi_2 & -\sin\theta_2 \\ (\sin\theta_2 \sin\phi_2 \cos\psi_2 - \sin\psi_2 \cos\phi_2) & (\sin\theta_2 \sin\phi_2 \sin\psi_2 + \cos\phi_2 \cos\psi_2) & \sin\phi_2 \cos\theta_2 \\ (\cos\phi_2 \sin\theta_2 \cos\psi_2 + \sin\phi_2 \sin\psi_2) & (\cos\phi_2 \sin\theta_2 \sin\psi_2 - \cos\psi_2 \sin\phi_2) & \cos\phi_2 \cos\theta_2 \end{bmatrix} \qquad (4)$$

Where:

$\theta_1, \phi_1, \psi_1$ ≡ gimbal angles (synchros) of measuring unit No. 1

$\theta_2, \phi_2, \psi_2$ ≡ gimbal angles (synchros) of measuring unit No. 2

If the gyroscopes in both inertial measuring units are perfect, neither cluster will be drifting, and the matrix B will be constant. In general, however, the two clusters will both be drifting because the sensors are not perfect, and this drift rate will be exhibited as a slow variation in the matrix B. If, however, a gyroscope in either cluster should fail so that its effective drift rate becomes very high, the matrix B will change very rapidly. Over some parity interval, the matrix B will change by some amount which is greater than a predetermined threshold based upon permitted drift rates of the gyroscopes. In that event, and in accordance with the teachings of the present invention, the failed gyroscope may be identified.

If a gyroscope has failed, the cluster which contains it will rotate about the input axis of the failed gyroscope. To detect such a situation, the matrix B is observed at two successive test times $t_n$ and $t_{n+1}$. Where C is the matrix relating the cluster rotation between time $t_n$ and time $t_{n+1}$. Since B is orthogonal, it is always invertible, and we have:

$$C = B_n^{-1} B_{n+1} = B_n^T B_{n+1} \qquad (6)$$

The axis about which the cluster has rotated to produce the non-identity matrix C is that axis which is invariant under the rotation C. Thus, the axis $X_i$ satisfies the equation:

$$C X_i = X_i \qquad (7)$$

$$(C - I) X_i = 0 \qquad (8)$$

$$(B_n^T B_{n+1} - I) X_i = 0 \qquad (9)$$

where $I$ is the identity matrix

Thus, if the eigenvector, which corresponds to eigenvalue $= +1$, of the change in $B$ is found, it will lie principally along the input axis of the failed gyro. Since there are only six possible failed input axes, the determination of this eigenvector is accomplished simply by testing the unit vector of each input axis in the above equation until it comes closest to being satisfied.

It is likely that no gyroscope input axis will perfectly satisfy the equation because, as mentioned above, all the gyroscopes are drifting to a degree. However, the input axis of the failed gyroscope will come much closer to satisfying the equation, than will any of the other input axes. By proper selection of the threshold for identifying a failure and for satisfying the eigenvector equation, the technique permits identification of at least the first gyroscope failure.

Assuming that a failure does not catastrophically destroy the platform, the process can be repeated in the event of a second failure. This time, the eigenvector satisfying the equation will be $X_2$, where $$X_2 = X_i + X_j.$$

The first failed gyroscope with input $X_i$, will combine with the second failed gyroscope with the input axis $X_j$ to provide the composite eigenvector $X_2$. Therefore, the solution of $X_j$ is accomplished in the same manner as the solution of $X_i$, except that only five axes need be tested, and each must be vectorially added to the first failed input axis $X_i$, before testing against the eigenvector equation.

The aforesaid equations may be computed by known types of real time digital general purpose computers, such as designated 10 in FIG. 1, with a minimum of impact on either time or memory loading.

Therefore, in order to implement the malfunction detection of one or more gyroscopes in the inertial measuring units No. 1 and No. 2, it is necessary for the two clusters to be skewed with respect to one another as shown in FIG. 4, and it will be assumed that both clusters are also skewed with respect to the desired inertial coordinate system. Thus, we have the transformation matrix of the inertial measurement unit No. 1 with respect to the vehicle frame 19 as $T_1$, and the transformation matrix of the inertial measuring unit No. 2 with respect to the vehicle frame 19 as $T_2$, with the transformation matrix $B$ between the two units, as described above.

For proper execution of the process, the angular relationship between the two clusters (matrix $B$) must be determined during alignment. Once this relationship is determined and stored in the computer 10, the required malfunction detection logic can be executed. This is achieved in the computer 10 by sampling the value $B$ at specified intervals, and then by solving the equations set forth above. The computer then provides an output to a suitable indicator or control system identifying the failed gyroscope should a fault occur.

While a particular embodiment of the invention has been described, modifications may be made. It is intended in the following claims to cover the modifications which come within the spirit and scope of the invention.

What is claimed is:

1. A method for monitoring the performance of an inertial navigation system in a vehicle which includes a first and a second inertial measuring unit, each inertial measuring unit including an instrument cluster having a plurality of gyroscopes effective about predetermined respective axes, said method including the steps of:

orienting the first and second inertial measuring units so that the instrument cluster of one of said units is skewed relative to the instrument cluster of the other of said units;

determining the angular relationship of each of the two clusters with respect to the vehicle body coordinate system to obtain respective transformation matrices $T_1$ and $T_2$;

determining the angular relationship between the two clusters to obtain the transposition matrix $B$;

determining the values $B_n$ and $B_{n+1}$ of the matrix $B$ at spaced time intervals $t_n$ and $t_{n+1}$; and indicating when the value of the matrix $B$ changes by an amount in excess of a predetermined threshold from one of said spaced intervals to another to identify a failed gyroscope in one of the clusters.

2. The method defined in claim 1, and which includes the step of determining the axis about which the failed cluster rotates to produce the aforesaid change in the matrix $B$ in excess of said predetermined threshold.

3. The method defined in claim 2, in which said axis is detected by testing the vector relationship of each input axis $X_i$ against the equation $(B_n^T B_{n+1} - I) X_i = 0$, until the equation is satisfied within said predetermined threshold.

4. A system for monitoring the performance of an inertial navigation system in a vehicle including:

a first and a second inertial measuring unit, each including an instrument cluster having a plurality of gyroscopes effective about predetermined respective axes, and positioned in a vehicle so that the instrument cluster of one of said units is skewed relative to the instrument cluster of the other;

means included in each of said instrument clusters for producing signals representative of the pitch angle, roll angle, azimuth angle of the vehicle with respect to said instrument cluster; and computer means coupled to said clusters and responsive to the aforesaid signals for determining the angular relationship of each of said clusters with respect to said vehicle reference coordinate system so as to obtain respective transformation matrices $T_1$ and $T_2$, utilizing said transformation matrices $T_1$ and $T_2$ to determine the angular relationship between the two clusters so as to obtain a transformation matrix $B$;

determining the values $B_n$ and $B_{n+1}$ of the matrix B at spaced time intervals $t_n$ and $t_{n+1}$, and indicating when the value of the matrix $B$ changes by an amount in excess of a predetermined threshold from one of the aforesaid spaced intervals to another to identify a failed gyroscope in one of said clusters.

5. The system defined in claim 4, in which said computer means determines the axis about which the failed gyroscope rotated to produce the aforesaid change in the matrix $B$ in excess of said predetermined threshold.

6. The system defined in claim 4, in which said computer means determines said axis by testing the vector relationship of each input axis $X_i$ against the equation $(B_n^T B_{n+1} - I) X_i = 0$ until the said equation is satisfied within said predetermined threshold.

* * * * *